United States Patent
Berndtson et al.

(10) Patent No.: US 10,351,026 B1
(45) Date of Patent: Jul. 16, 2019

(54) VEHICLE SEAT INCLUDING STOWABLE INFANT CAR SEAT BASE

(71) Applicant: GM Global Technology Operations LLC, Detroit, MI (US)

(72) Inventors: John J. Berndtson, Grosse Pointe Woods, MI (US); Larisa M. Ensign, Royal Oak, MI (US); Anne M. Gatt, Warren, MI (US); James M. Faucett, Novi, MI (US); Nittin Jindia, West Bloomfield, MI (US); Roshan M. Shah, Walled Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/850,088

(22) Filed: Dec. 21, 2017

(51) Int. Cl.
　　*B60N 2/28* (2006.01)
　　*A47C 1/08* (2006.01)
　　*B60N 2/02* (2006.01)
　　*B60N 2/90* (2018.01)

(52) U.S. Cl.
　　CPC ............ *B60N 2/2827* (2013.01); *A47C 1/08* (2013.01); *B60N 2/0232* (2013.01); *B60N 2/2866* (2013.01); *B60N 2/995* (2018.02)

(58) Field of Classification Search
　　CPC .......... B60N 2/2866; B60N 2002/2896; B60N 2002/022; A47C 1/08; A47C 1/11
　　USPC .......................................... 297/188.1, 188.08
　　See application file for complete search history.

(56) References Cited

U.S. PATENT DOCUMENTS

| | | | | |
|---|---|---|---|---|
| 993,633 | A * | 5/1911 | Ambrock | A47G 25/10 211/31 |
| 3,281,183 | A * | 10/1966 | Manglos | A47C 1/11 297/238 |
| 4,802,706 | A * | 2/1989 | Onimaru | B60N 2/0224 296/68 |
| 5,573,288 | A * | 11/1996 | Raffensperger | A47C 1/16 297/188.1 |
| 6,168,234 | B1 * | 1/2001 | Haynes | B60N 2/143 297/344.21 |
| 7,036,883 | B1 * | 5/2006 | Thompson | B60N 2/0224 297/344.24 |
| 7,334,839 | B1 * | 2/2008 | Malerba | B60N 2/002 297/217.1 |
| 8,220,856 | B2 * | 7/2012 | Horiguchi | B60N 2/14 296/65.01 |

(Continued)

FOREIGN PATENT DOCUMENTS

| | | | | |
|---|---|---|---|---|
| DE | 19712969 A1 * | 10/1997 | | B60N 2/283 |
| DE | 102014201633 A1 * | 7/2015 | | B60N 2/06 |

(Continued)

*Primary Examiner* — Timothy J Brindley

(57) ABSTRACT

A seat system of a vehicle includes a cushion portion configured to support an occupant sitting on the cushion portion, and a back portion configured to support the back of the occupant sitting on the cushion portion. A lower portion includes: a first side; a second side that is opposite the first side; and an infant car seat base located on the first side. An actuator is configured to selectively actuate the lower portion to: a first position where the infant car seat base is located entirely under the cushion portion; and a second position where at least a portion of the second side of the lower portion contacts the cushion portion and the infant car seat base is located entirely above the cushion portion.

22 Claims, 13 Drawing Sheets

(56) References Cited

U.S. PATENT DOCUMENTS

| | | | | |
|---|---|---|---|---|
| 9,764,662 | B1* | 9/2017 | Ramos Valencia | B60N 2/265 |
| 2004/0232747 | A1* | 11/2004 | Yamazaki | B60N 2/2806 |
| | | | | 297/250.1 |
| 2013/0193723 | A1* | 8/2013 | Wuerstl | A47D 13/02 |
| | | | | 297/183.3 |
| 2013/0200671 | A1* | 8/2013 | Herzberg | B60N 2/28 |
| | | | | 297/250.1 |
| 2013/0320725 | A1* | 12/2013 | Conway | B60N 2/2851 |
| | | | | 297/256.11 |
| 2016/0332539 | A1* | 11/2016 | Rawlinson | B60N 2/0244 |
| 2017/0341541 | A1* | 11/2017 | Wuerstl | B60N 2/2845 |

FOREIGN PATENT DOCUMENTS

| | | | | | |
|---|---|---|---|---|---|
| EP | 1724193 | A1 | * | 11/2006 | B60R 22/024 |
| EP | 2913220 | A1 | * | 9/2015 | B60N 2/0284 |
| EP | 3339089 | A1 | * | 6/2018 | B60N 2/2866 |
| FR | 2936750 | A1 | * | 4/2010 | B60N 2/2866 |
| FR | 2972153 | A1 | * | 9/2012 | B60N 2/2866 |
| FR | 2990901 | A1 | * | 11/2013 | B60N 2/2866 |

\* cited by examiner

VEHICLE SEAT INCLUDING STOWABLE INFANT CAR SEAT BASE

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle seats and more particularly to vehicle seats with leg rests and car seat bases.

There are various different kinds of car seats, such as infant car seats and all-in-one car seats. All-in-one car seats are adjustable to accommodate children of different sizes, heights, and weights.

Infant car seats include an infant car seat base and an infant car seat carrier. The infant car seat base is secured to a vehicle seat via a seat belt and/or seat anchors. The infant carrier latches to the infant car seat base to secure the infant carrier to the infant car seat base. The infant carrier can be unlatched from the infant car seat base via actuating one or more actuators, for example, to remove the infant carrier from a vehicle.

SUMMARY

In a feature, a seat system of a vehicle is described. A cushion portion is configured to support an occupant sitting on the cushion portion, and a back portion is configured to support the back of the occupant sitting on the cushion portion. A lower portion includes: a first side; a second side that is opposite the first side; and an infant car seat base located on the first side. An actuator is configured to selectively actuate the lower portion to: a first position where the infant car seat base is located entirely under the cushion portion; and a second position where at least a portion of the second side of the lower portion contacts the cushion portion and the infant car seat base is located entirely above the cushion portion.

In further features, the actuator is further configured to an actuator configured to selectively actuate the lower portion to: a third position where the first side of the lower portion faces upward and the second side of the lower portion faces downward.

In further features, the infant car seat base includes a plurality of connection devices that are configured and arranged to connect to a plurality of different types of infant carriers.

In further features, the seat system further includes a plurality of anchors, and the lower portion further includes a plurality of latching mechanisms configured to latch to the plurality of anchors.

In further features, the plurality of anchors are located between an end of the cushion portion and an end of the back portion.

In further features, the actuator includes a plurality of C-shaped brackets that are fixed at first ends to a rotating shaft and are connected at second ends to the lower portion.

In further features, the lower portion is configured to rotate about an axis between the second ends between: when the second side of the lower portion begins to contact the cushion portion; and when the lower portion reaches the second position.

In further features, the actuator further comprises an electric motor that rotates the rotating shaft based on power applied to the electric motor.

In further features, a seat control module is configured to selectively apply power to the electric motor based on signals from a user input device of the vehicle.

In further features, the seat control module is further configured to selectively apply power to the electric motor based on signals from a mobile device that is separate from the vehicle.

In further features: a frame supports the cushion portion and the back portion; and a plurality of side members and a back member, with the lower portion when the lower portion is in the first position, form an empty space under the cushion portion.

In further features, the seat system further includes: a rotatable plate; and a frame that supports the cushion portion and the back portion and that is held to the rotatable plate.

In further features, a seat control module is configured to selectively rotate the rotatable plate based on signals from a user input device of the vehicle.

In further features, the seat control module is further configured to selectively rotate the rotatable plate based on signals from a mobile device that is separate from the vehicle.

In further features: a first track is fixed to the rotatable plate; and a second track is mounted to the frame and that is configured to move along the first track.

In further features, a seat control module is configured to selectively move the second track based on signals from a user input device of the vehicle.

In further features, the seat control module is further configured to selectively move the second track based on signals from a mobile device that is separate from the vehicle.

In further features, the infant car seat base includes a plurality of connection devices that are configured and arranged to connect to a plurality of different types of infant carriers manufactured by different manufacturers.

In a feature, a seat system of a vehicle is described. A cushion portion is configured to support an occupant sitting on the cushion portion, and a back portion is configured to support the back of the occupant sitting on the cushion portion. A lower portion includes: a first side; a second side that is opposite the first side; and an infant car seat base located on the first side includes a plurality of connection devices that are configured and arranged to connect to a plurality of different types of infant carriers manufactured by different manufacturers. An actuator is configured to selectively actuate the lower portion to: a first position where the infant car seat base is located entirely under the cushion portion; a second position where at least a portion of the second side of the lower portion contacts the cushion portion and the infant car seat base is located entirely above the cushion portion; and a third position where the first side of the lower portion faces upward and the second side of the lower portion faces downward. A plurality of anchors are located between an end of the cushion portion and an end of the back portion. The lower portion further includes a plurality of latching mechanisms configured to latch to the plurality of anchors. A frame supports the cushion portion and the back portion and that is held to a rotatable plate. A plurality of side members and a back member, with the lower portion when the lower portion is in the first position, form an empty space under the cushion portion. A first track is fixed to the rotatable plate. A second track is mounted to the frame and that is configured to move along the first track.

In further features, a seat control module is configured to: selectively actuate the actuator based on signals from a first user input device of the vehicle and based on signals from a mobile device that is separate from the vehicle; selectively rotate the rotatable plate based on signals from a second user input device of the vehicle and based on the signals from the mobile device that is separate from the vehicle; and selectively move the second track based on signals from a third user input device of the vehicle and based on the signals from the mobile device that is separate from the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicle seats include a cushion portion and a back portion that are attached to a seat frame. Occupants sit on top of the cushion portion of a vehicle seat. Occupants rest their backs against the back portions of vehicle seats. The frame of a vehicle seat supports the cushion portion and the back portion and secures the vehicle seat to (e.g., a floor of) a vehicle.

Infant car seats include two parts, an infant car seat base and an infant carrier that connects to and disconnects from the infant car seat base. An infant can be seated and buckled within an infant carrier.

Installation of the infant car seat begins with installing the infant car seat base on the cushion portion of a vehicle seat via a seat belt and/or attachment of latching mechanisms of the infant car seat base to structural members of the vehicle seat, such as seat anchors. The infant car seat base may take a significant period to install in a vehicle, even if the installer is familiar with the vehicle. In a shared vehicle, the installer may not be familiar with the vehicle. An increase in downtime of a shared vehicle may cause a decrease in possible revenue of the shared vehicle, and vice versa.

According to the present disclosure, a vehicle seat is disclosed that includes a cushion portion, a back portion, and a lower portion. An infant car seat base is located on a first side of the lower portion. A second side of the lower portion that is opposite the first side of the lower portion can be used as a leg rest.

A seat control module controls operation of the seat and actuation of the lower portion in response to user input. For example, based on user input, the seat control module may actuate the lower portion to a first position where the lower portion encloses an area under the vehicle seat, for example, for storage of items under the seat and limiting movement of objects located under the seat. The seat control module may actuate the lower portion to a second position where the infant car seat base is positioned on top of the cushion portion for latching of an infant carrier to the infant car seat base. The infant car seat base may include a plurality of latching elements configured to latch with a plurality of different types of infant carriers including those manufactured by different infant car seat manufacturers. The seat control module may actuate the lower portion to a third position that is (angularly) between the first position and the second position. When the lower portion is in the third position, the second side of the lower portion faces outward and can be used as a leg rest by an occupant seated on the cushion portion of the vehicle seat.

Figure 1:
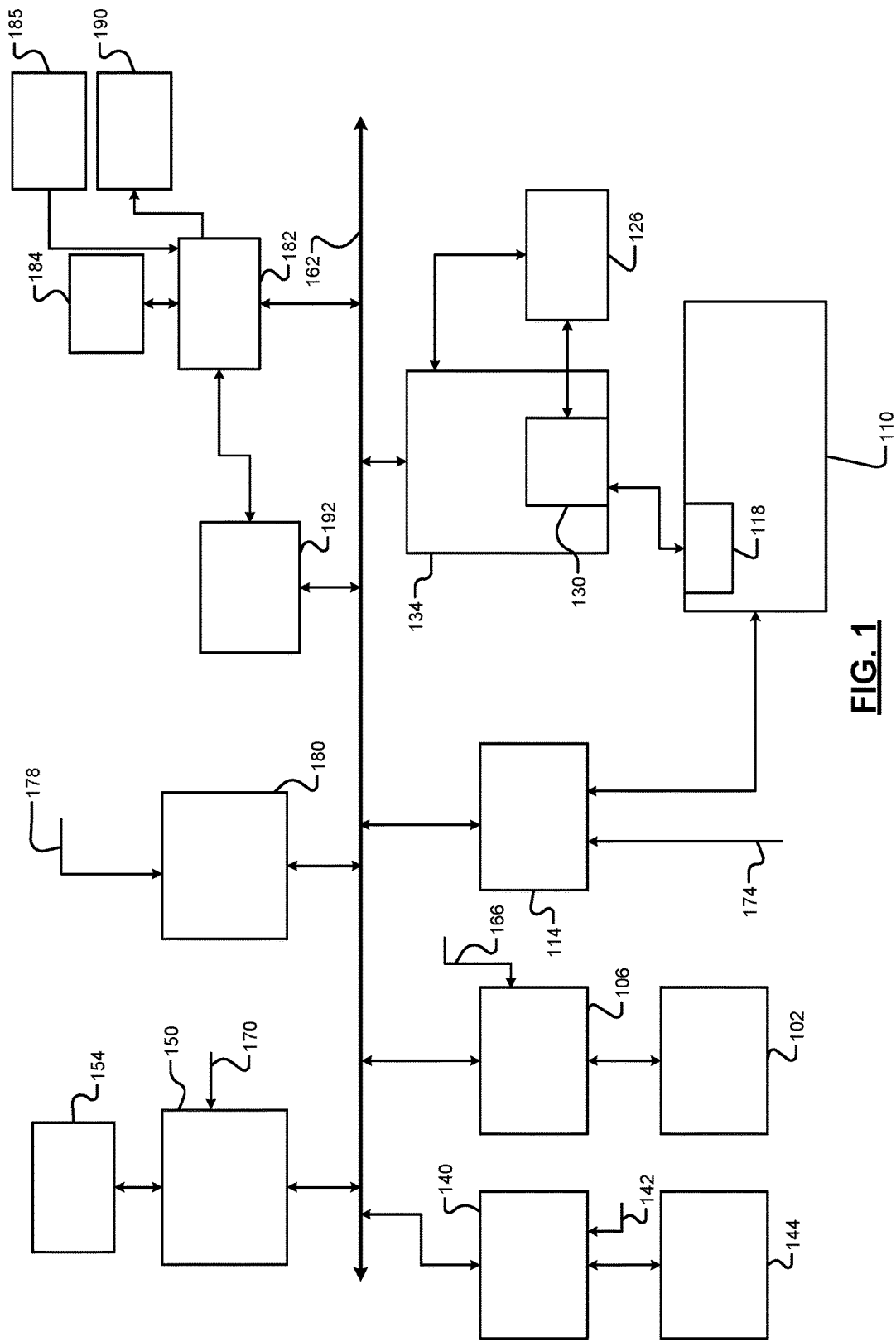
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to non-hybrid vehicles, electric vehicles, fuel cell vehicles, autonomous vehicles, shared vehicles, non-shared vehicles, and other types of vehicles.

An engine 102 combusts an air/fuel mixture to generate drive torque. An engine control module (ECM) 106 controls the engine 102 based on a torque request, such as a torque request determined based on one or more driver inputs. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle analysis modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system. An electronic brake control module (EBCM) 150 may selectively control brakes 154 of the vehicle.

Modules of the vehicle may share parameters via a network 162, such as a controller area network (CAN). In vehicles, CAN may also stand for car area network. The network 162 may include one or more data buses. Various parameters may be made available by a given control module to other control modules via the network 162.

The driver inputs may include, for example, an accelerator pedal position (APP) 166 which may be provided to the ECM 106. A brake pedal position (BPP) 170 may be provided to the EBCM 150. A position 174 of a range selector, such as a park, reverse, neutral, drive lever (PRNDL), may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

The vehicle system also includes an infotainment module 182. The infotainment module 182 controls what is displayed on a display 184. The display 184 may be a touchscreen display in various implementations and transmit signals indicative of user input to the display 184 to the infotainment module 182. The Infotainment module 182 may additionally or alternatively receive signals indicative of user input from one or more other user input devices 185, such as one or more switches, buttons, knobs, etc.

The infotainment module 182 may also generate output via one or more other devices. For example, the infotainment module 182 may output sound via one or more speakers 190 of the vehicle. The vehicle may include one or more additional control modules that are not shown, such as a chassis control module, a battery pack control module, etc. The vehicle may omit one or more of the control modules shown and discussed.

A seat control module 192 selectively controls actuation of one or more seats in the passenger compartment of the vehicle.

Figure 2:
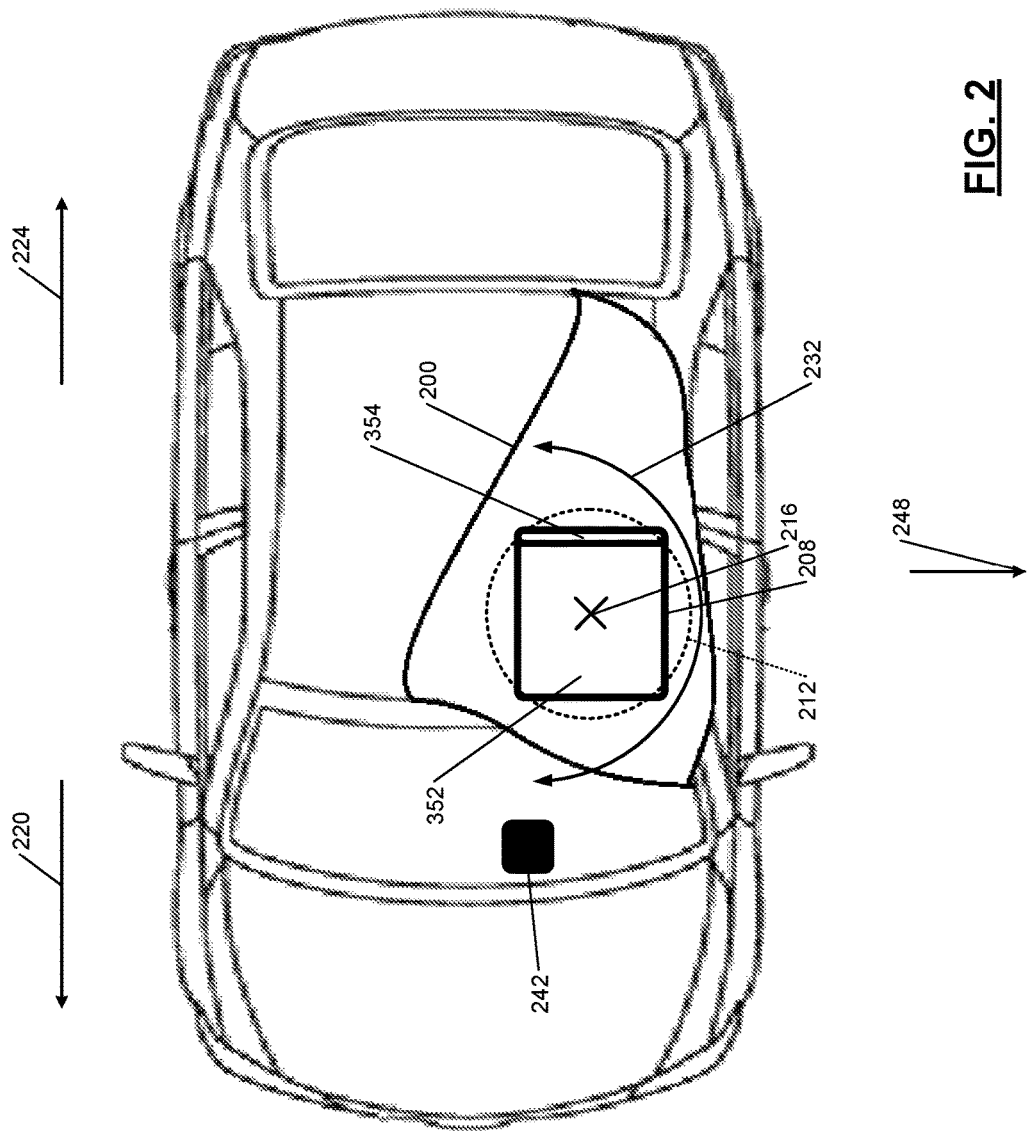
FIG. 2 is a top view of an example vehicle including a seat.

FIG. 2 includes a top view of an example vehicle including an example cutaway portion 200. A seat 208 is located within the passenger compartment of the vehicle. The seat 208 is mounted to a rotatable plate 212 that rotates about an axis of rotation 216. The seat 208 may be rotatable 360 degrees or rotation of the seat 208 may be limited to less than 360 degrees. For example, rotation of the seat 208 may be limited to 180 degrees between a forward direction 220 of travel of the vehicle and a backward direction 224 of travel of the vehicle. An example of 180 degrees of rotation of the seat 208 is illustrated by 232.

The seat 208 can be positioned at the forward direction 220 and the backward direction 224. The seat 208 can also be positioned at any position that is rotationally between the forward direction 220 and the backward direction 224 such as facing in an outward direction 248.

The seat 208 may also be moveable in a longitudinal direction of the vehicle. A cushion portion 352 of the seat 208 and/or a back portion 354 may be actuatable. For example, an angular position of the back portion 354 may be actuated manually via a user or, for example, via one or more electric motors based on user input.

The vehicle includes a transceiver 242. The transceiver 242 may facilitate communication between the seat control module 192 and computing devices, such as smartphones, tablets, laptop computing devices, desktop computing devices, and other types of computing devices. While the example of one seat system is described in detail herein, the vehicle includes two or more seats.

Figure 3:
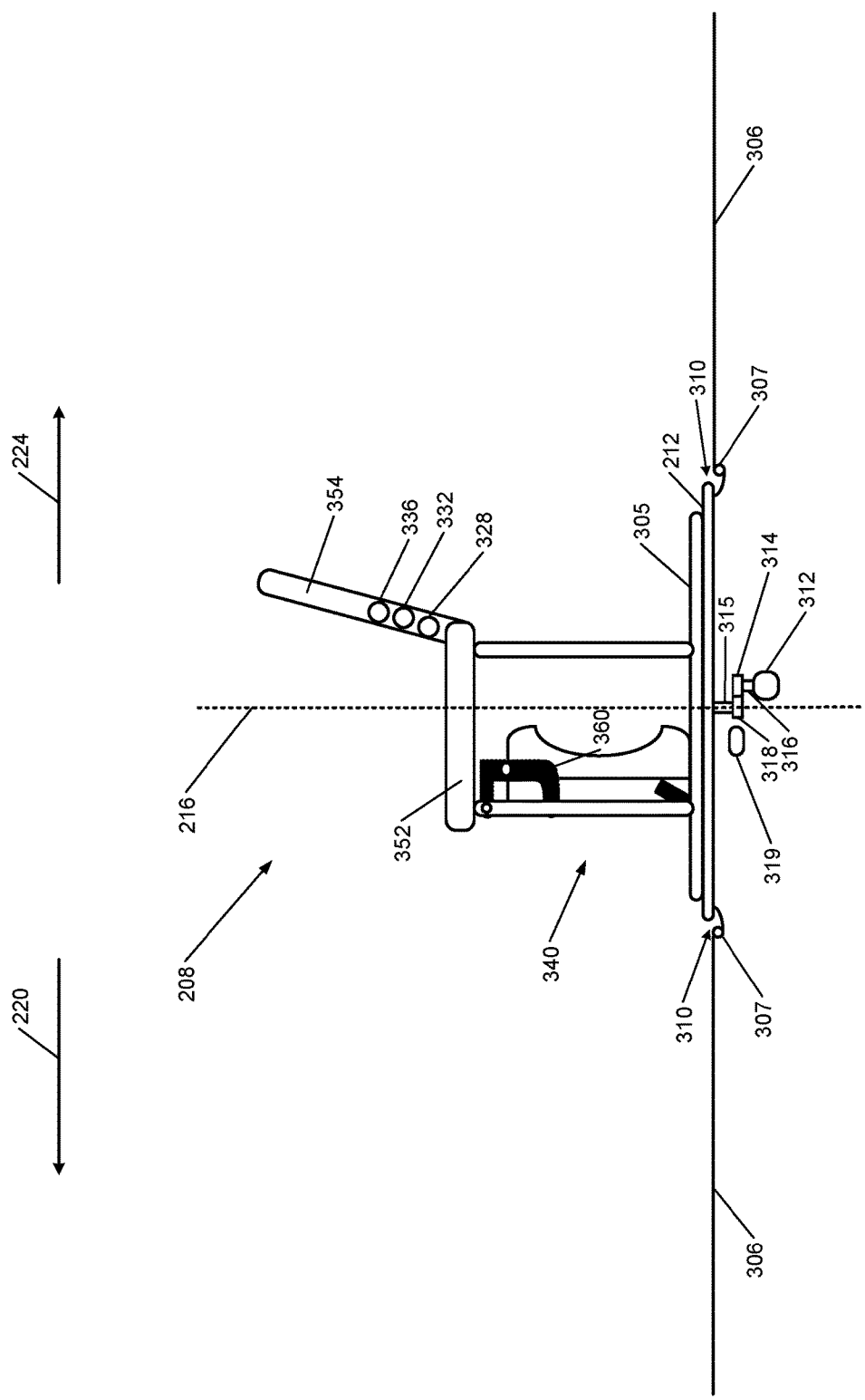
FIG. 3 includes a functional block diagram of a side view of a seat.

FIG. 3 includes a functional block diagram of an example side view of the seat 208. The seat 208 includes the cushion portion 352 and the back portion 354. The seat 208 also includes a lower portion 340. An actuator assembly is configured to actuate the lower portion 340 to first, second, and third positions, as discussed further below. For example, the actuator may include a plurality of brackets that are attached to the seat 208 and the lower portion 340. The seat 208 is illustrated facing the forward direction 220 of travel of the vehicle.

The seat 208 is mounted to and moveable via a plurality of rails 305. The seat 208 also includes a first user input device 328, a second user input device 332 and a third user input device 336. While example locations of the first, second, and third user input devices 328, 332, and 336 are provided, the first, second, and third user input devices 328, 332, and 336 may be located in other locations. The first, second, and third user input devices 328-336 may be, for example, switches, buttons, or another suitable type of user input device.

The seat control module 192 rotates the rotatable plate 212 (and therefore a rotational position of the seat 208) based on input from the first user input device 328. The seat control module 192 linearly actuates the seat 208 along the rails based on input from the second user input device 332. The seat control module 192 rotates the lower portion 340 of the seat 208 (and therefore a position of the lower portion 340) based on input from the third user input device 336. The seat 208 may also include a fourth user input device. The seat control module 192 may actuate the back portion 354 (and therefore control a recline angle of the back portion 354) based on input from the fourth user input device.

The rotatable plate 212 is secured to a floor 306 of the vehicle and rotates, for example, via one or more rollers 307, such as one or more bearings, that engage an underside of the floor 306 and that roll around a periphery of an opening 310 for the rotatable plate 212 in the floor 306. A first electric motor 312 drives rotation of the rotatable plate 212 and, therefore, the seat 208. For example, a first toothed wheel 314 may be coupled to an output shaft 316 of the first electric motor 312, and a second toothed wheel 318 may be coupled to a shaft 315 that is coupled to the rotatable plate 212. While this example is provided, the first electric motor 312 may drive the rotatable plate 212 using another type of drivetrain. The first electric motor 312 may be a servomotor or another suitable type of motor.

The first electric motor 312 drives rotation of the rotatable plate 212 when power is applied to the first electric motor 312. The seat control module 192 selectively applies power to the first electric motor 312 to adjust the rotational position of the seat 208 to a target rotational position. The seat control module 192 may apply power to the first electric motor 312, for example, from one or more batteries of the vehicle.

A rotational position sensor 319 measures the rotational position of the seat 208. The rotational position sensor 319 generates a rotational position signal 620 based on the rotational position. For example only, the rotational position sensor 319 may be a Hall effect sensor, a variable reluctance sensor, or another suitable type of position sensor. The rotational position sensor 319 may determine the rotational position, for example, based on teeth of the second toothed wheel 318 passing the rotational position sensor 319. The rotational position may be expressed as an angle, for example, with respect to the forward direction 220 of travel of the vehicle where 0 degrees corresponds to the forward direction 220 and positive angles are expressed relative to the forward direction 220.

Figure 4:
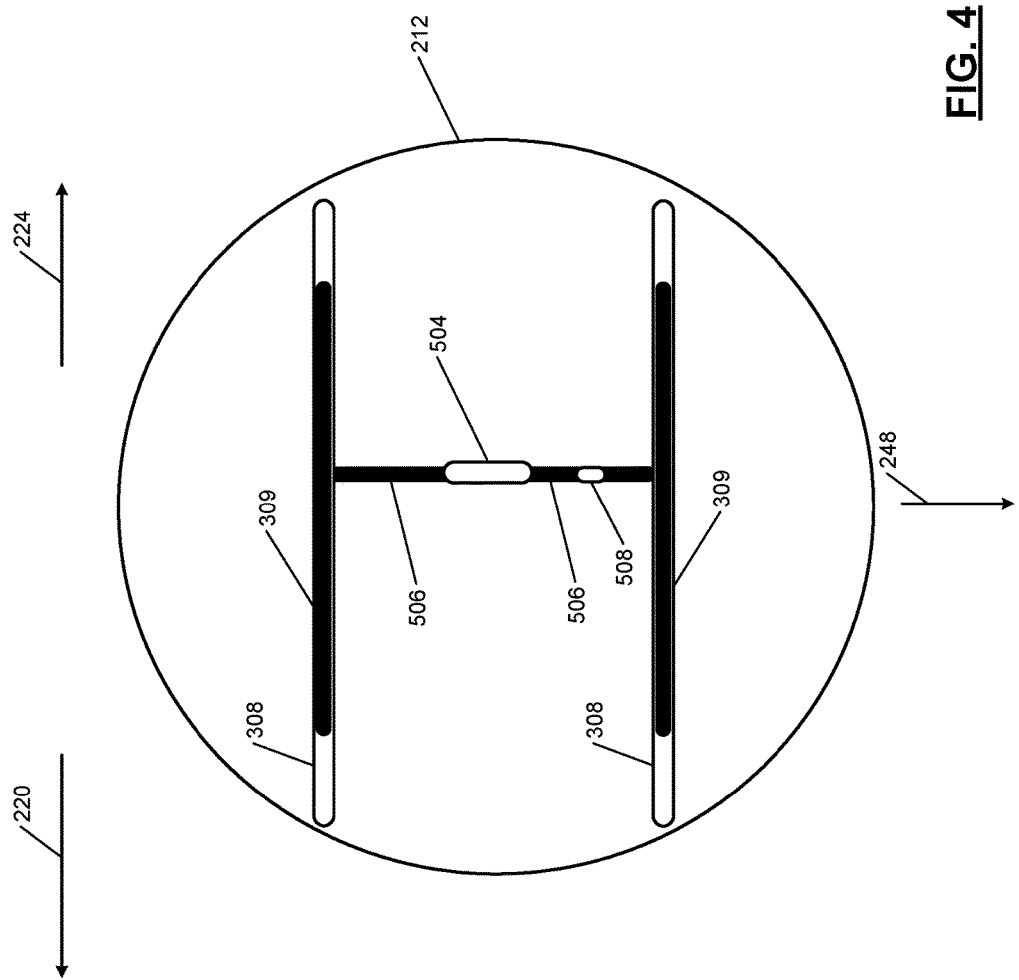
FIG. 4 includes a top view of a rotatable plate.

With reference to FIG. 4, an example of a top view of the rotatable plate 212 is shown. The plurality of rails 305 includes a plurality of fixed rails 308 and a plurality of moveable rails 309. The plurality of fixed rails 308 are fixed to the rotatable plate 212. The plurality of moveable rails 309 are mounted the seat 208. The plurality of moveable rails 309 are configured to move (e.g., slide) along the plurality of fixed rails 308.

A second electric motor 504 drives an output shaft 506 that drives the movement of the plurality of moveable rails 309 along the plurality of fixed rails 308. The seat control module 192 selectively applies power to the second electric motor 504 to adjust a longitudinal position of the seat 208 to a target longitudinal position. The seat control module 192 may apply power to the second electric motor 504, for example, from one or more batteries of the vehicle.

A longitudinal position sensor 508 measures the longitudinal position of the seat 208. The longitudinal position sensor 508 generates a longitudinal position signal 628 based on the longitudinal position. The longitudinal position may be expressed in centimeters, meters, inches, or any other suitable measurement.

Figure 5:
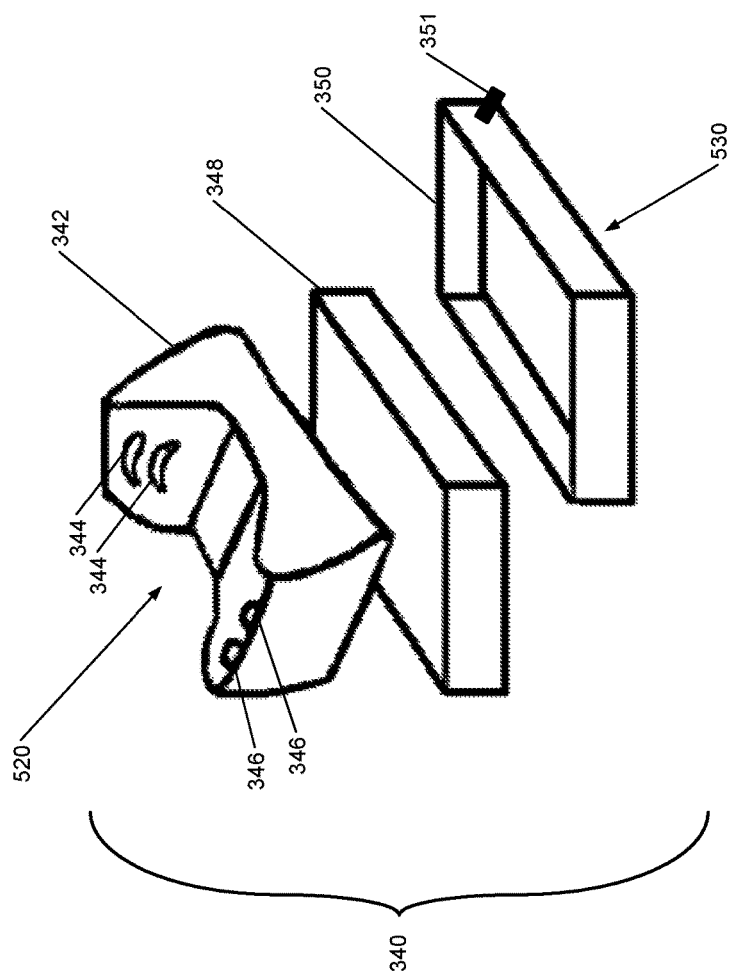
FIG. 5 is an isometric view of a lower portion of a seat including an infant car seat base on a first side and a leg rest on a second side.

Referring now to FIG. 5, an exploded view of an example of the lower portion 340 of the seat 208 is shown. The lower portion 340 includes an infant car seat base 342, an intermediate portion 348, and a frame 350. The infant car seat base 342 is located on a first side 520 that is opposite a second side 530 of the frame 350. The intermediate portion 348 may be made of foam or another suitable material. In various implementations, the intermediate portion 348 may be omitted.

The infant car seat base 342 is configured to connect to a plurality of different types of infant carriers including infant carriers of a plurality of different infant car seat manufactures. The infant car seat base 342 includes a plurality of connection devices, such as latches 344 and hooks 346, configured and arranged to connect to the plurality of different types of infant carriers. The infant car seat base 342 is fixed to the frame 350.

Legs of an occupant sitting on the cushion portion 352 of the seat 208 may contact the second side 530 of the frame 350. As stated above, the lower portion (and specifically the second side 530) may be used as a leg rest when the lower portion 340 is in some positions.

A plurality of latching mechanisms 351, such as LATCH (Lower Anchors and Tethers for Children) hooks, are located on the frame 350. While the latching mechanisms 351 are illustrated as being located on the frame 350, the latching mechanisms may instead be located on the infant car seat base 342.

The latching mechanisms 351 may be manually or electrically actuated to latch and unlatch the latching mechanisms 351 to and from a plurality of anchors 356, such as LATCH anchors, of the seat 208.

A lower portion position sensor 358 (FIG. 9) measures a position (e.g., rotational) of the lower portion 340 of the seat 208. The position may be expressed as an angle, for example, with respect to the position of the lower portion 340 shown in the example of FIG. 6A or the example of FIG. 9. The lower portion position sensor 358 generates a lower portion position signal 636 based on the position of the lower portion 340 of the seat 208.

Figure 6:
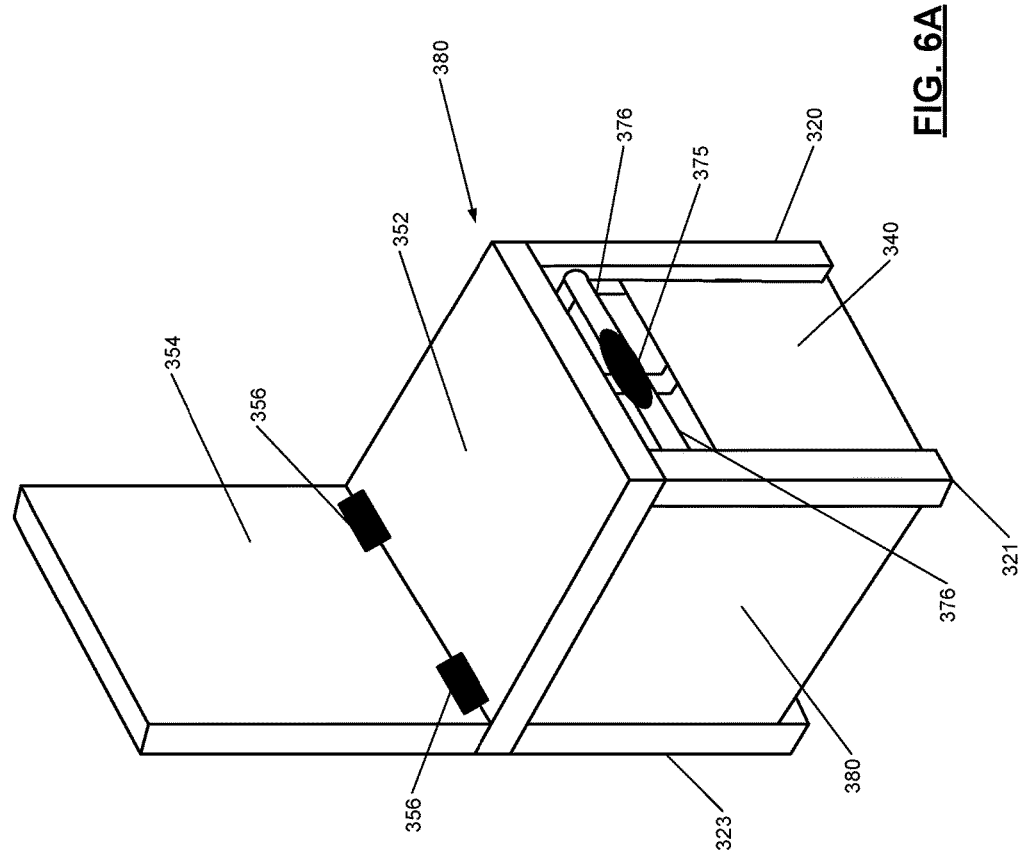
FIGS. 6A and 6B include a isometric views of a seat including a lower portion and a plurality of side members.

With reference to FIGS. 6A and 6B, isometric views of the seat 208 are shown. As discussed above, the seat 208 includes the cushion portion 352, the back portion 354, and the lower portion 340. The seat 208 also includes a frame, a back member 379, side members 380, a left bracket 360, a right bracket 361, and the anchors 356.

The frame may include a front left leg 320, a front right leg 321, a back left leg 322, and a back right leg 323. The cushion portion 352, the back portion 354, and the lower portion 340 are attached to the frame of the seat 208. The side members 380 and the back member 379 are also attached to the frame of the seat 208. More specifically, the back member 379 is connected between the back left leg 322 and the back right leg 323. One of the side members 380 is attached to and extends between the front left leg 320 and the back left leg 322. The other one of the side members 380 is attached to and extends between the front right leg 321 and the back right leg 323.

The anchors 356 are also connected to the frame of the seat 208. The anchors 356 are accessible between the cushion portion 352 of the seat 208 and the back portion 354 such that the latching members 351 can latch to the anchors 356. For example only, the seat 208 may include one anchor per latching mechanism included on the lower portion 340.

Figure 7:
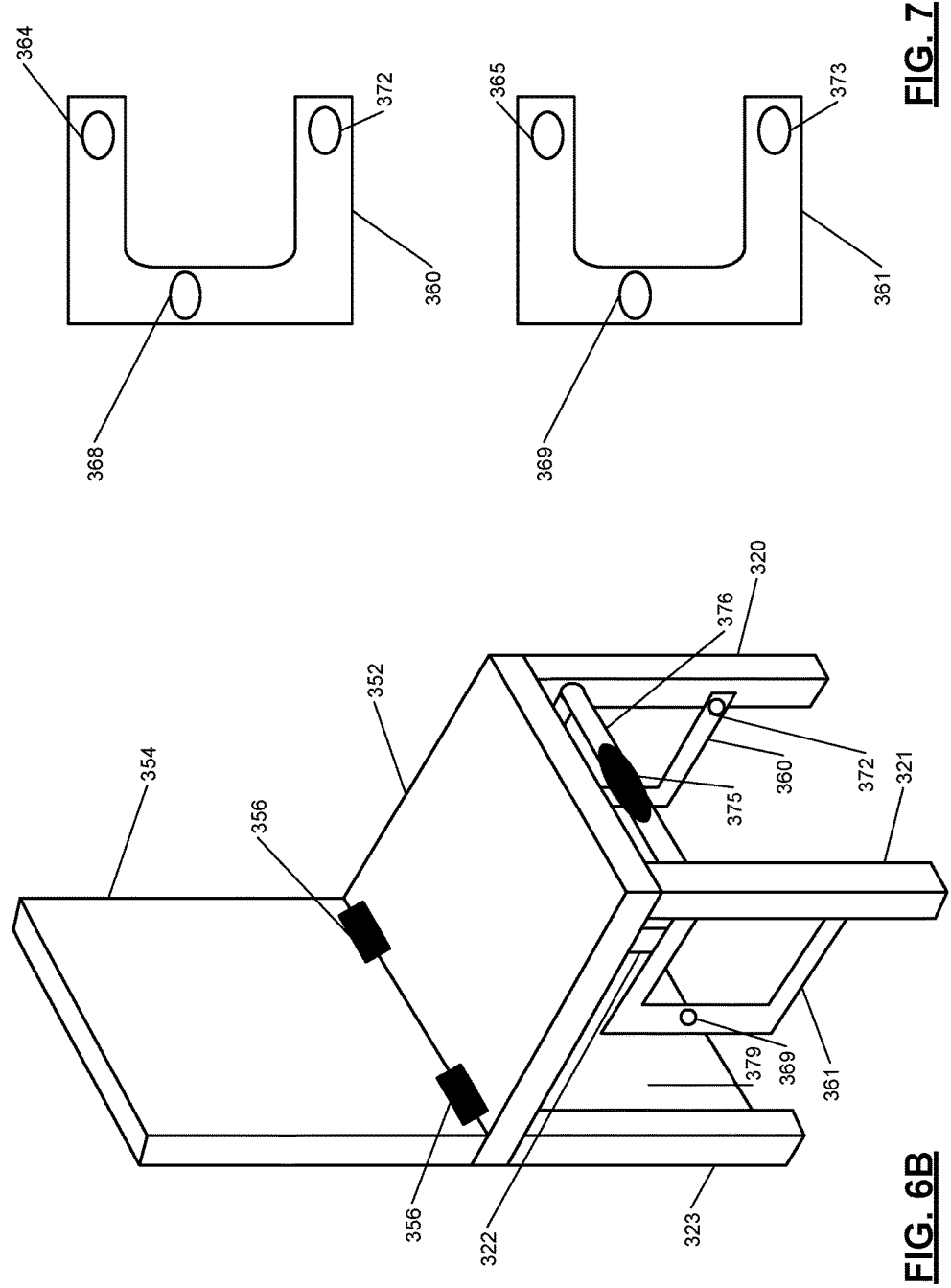
FIG. 7 includes an expanded view of a plurality of brackets that attach a lower portion to the seat.
Figure 8:
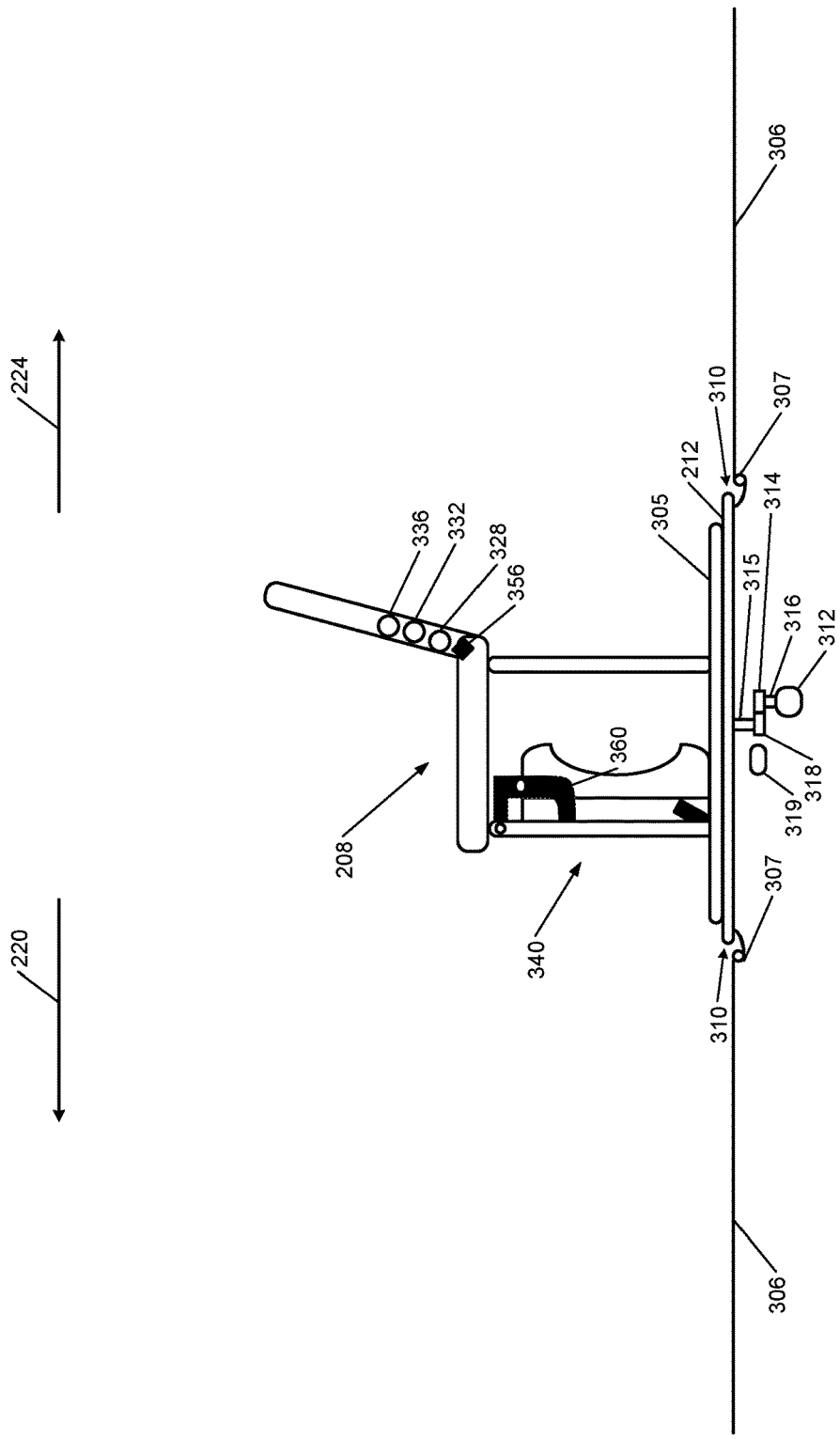
FIG. 8 includes a functional block diagram of a side view of a seat with a lower portion in a first position.

FIG. 7 include example side views of examples of the left bracket 360 and the right bracket 361. The right bracket 361 is connected to one side (e.g., the right side) of the frame of the seat 208 and one side (e.g., the right side) of the lower portion 340 of the seat 208. The left bracket 360 is connected to one side (e.g., the left side) of the frame of the seat 208 and one side (e.g., the left side) of the lower portion 340 of the seat 208.

More specifically, a first connection point 364 of the left bracket 360 is attached to a first output shaft 376 of an actuator 375. The first output shaft 376 rotates about an axis and is mounted between the front left leg 320 and the front right leg 321. A second connection point 372 of the left bracket 360 is attached to the lower portion 340. The second connection point 372 includes a bearing such that the lower portion 340 can rotate around the second connection point 372. The left bracket 360 also includes a stop 368 that protrudes inward towards the right bracket 361.

A first connection point 365 of the right bracket 361 is also attached to the first output shaft 376. A second connection point 373 of the right bracket 361 is attached to the lower portion 340. The second connection point 373 includes a bearing such that the lower portion 340 can rotate around the second connection point 373. The right bracket 361 includes a stop 369 that protrudes inward towards the left bracket 360. The stops 368 and 369 contact a portion of the lower portion 340 of the seat 208 to prevent rotation of the lower portion 340 about the second connection points 372 and 373 until the lower portion 340 reaches a predetermined rotational position.

The actuator 375 rotates the first output shaft 376 when power is applied to the actuator 375. Because the lower portion 340 is mounted to the first output shaft 376 via the first connection points 364 and 365 of the left and right brackets 360 and 361, the lower portion 340 moves as the first output shaft 376 rotates. The seat control module 192 selectively applies power to the actuator 375 based on, for example, input from the third user input device 336. The seat control module 192 may apply power to the actuator, for example, from one or more batteries of the vehicle. The actuator 375 may be an electric motor, such as a stepper motor, a servomotor, a rotary motor, or another suitable type of motor. In various implementations, two or more actuators may rotate the first output shaft 376.

FIGS. 8-11 include example side views of the lower portion 340 in various different positions. The lower portion 340 is in a first position in FIG. 8. The lower portion 340 creates a space (with the side members 380 and the back member 379) under the seat 208 when the lower portion 340 is in the first position. While the lower portion 340 is shown as contacting the floor in the example of FIG. 8, a gap of a predetermined size may be present between the lower portion 340 and the floor. Items may be stored within the space under the seat 208. The infant car seat base 342 is also stowed under the seat 208 when the lower portion 340 is in the first position.

Figure 9:
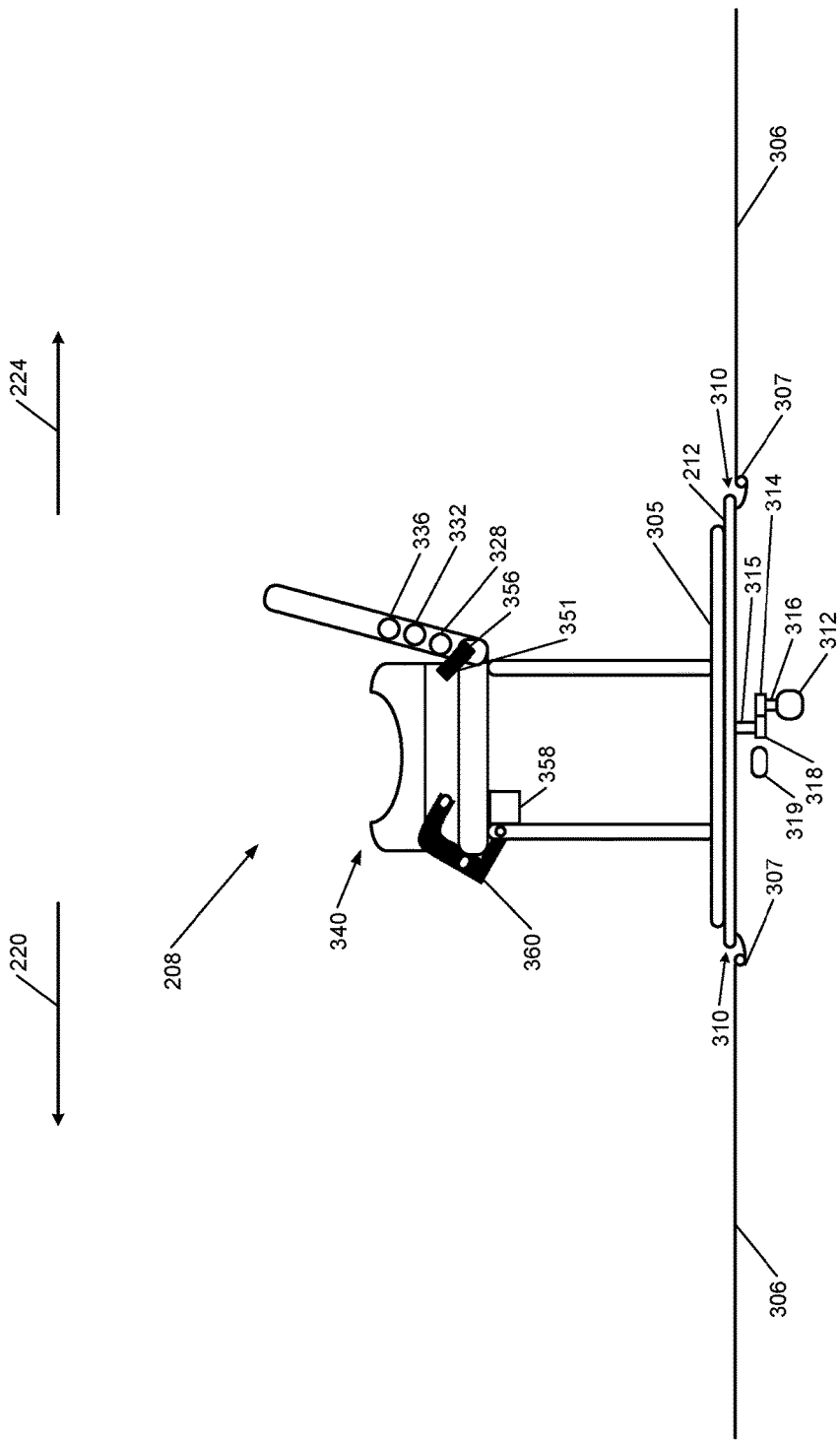
FIG. 9 includes a functional block diagram of a side view of a seat with a lower portion in a second position.

The lower portion 340 is in a second position in FIG. 9 where the infant car seat base 342 faces upward. An infant carrier can be latched to the lower portion 340 (and specifically the infant car seat base 342) when the lower portion 340 is in the second position.

Figure 10:
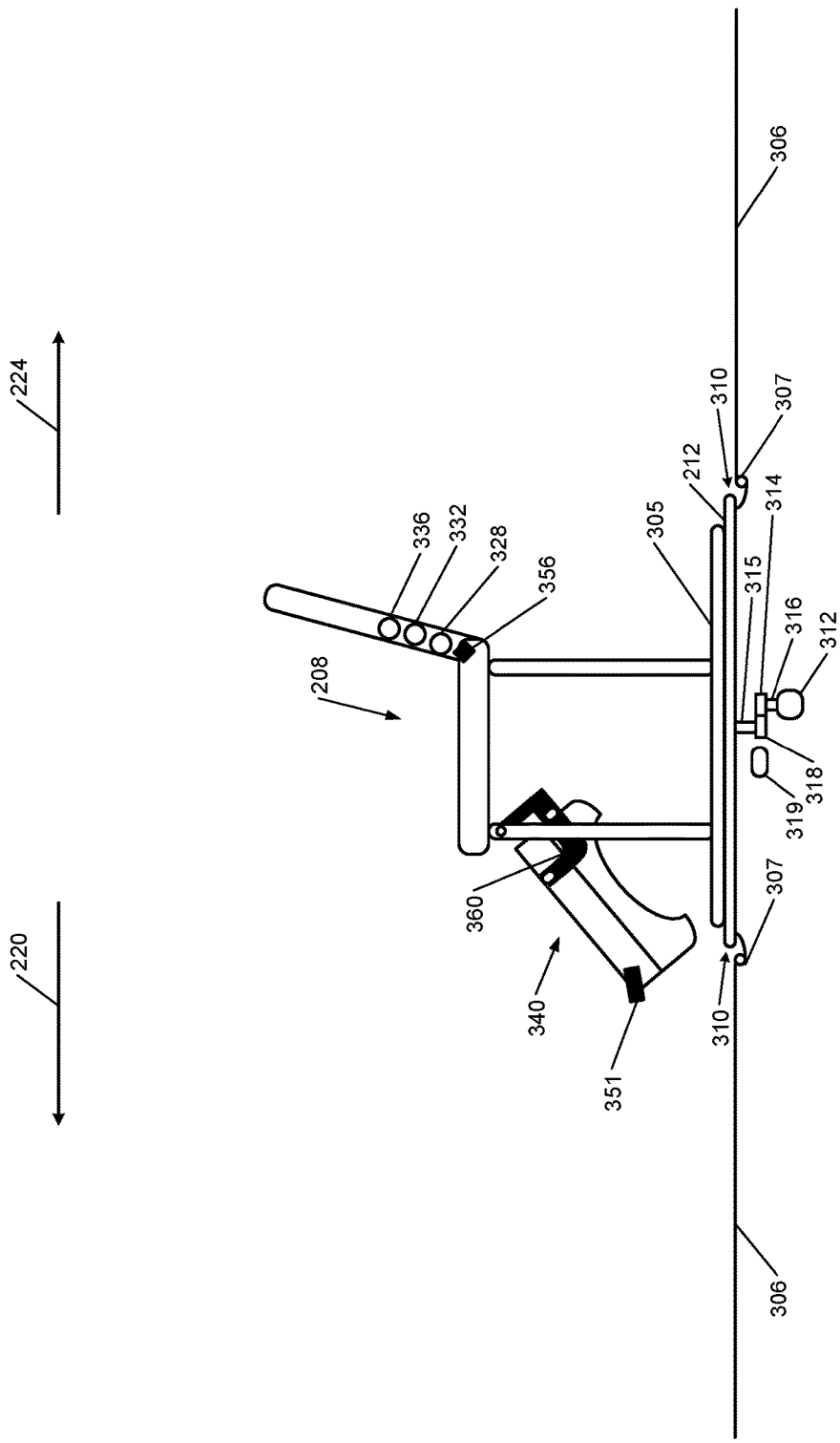
FIG. 10 includes a functional block diagram of a side view of a seat with a lower portion in a third position.

The lower portion 340 is in an example third position in FIG. 10 where the infant car seat base 342 faces downward. The second side 530, however, faces upward and can be used as a leg or foot rest when the lower portion 340 is in the third position. The third position is (in terms of rotation of the first output shaft 376) between the first position and the second position.

Figure 11:
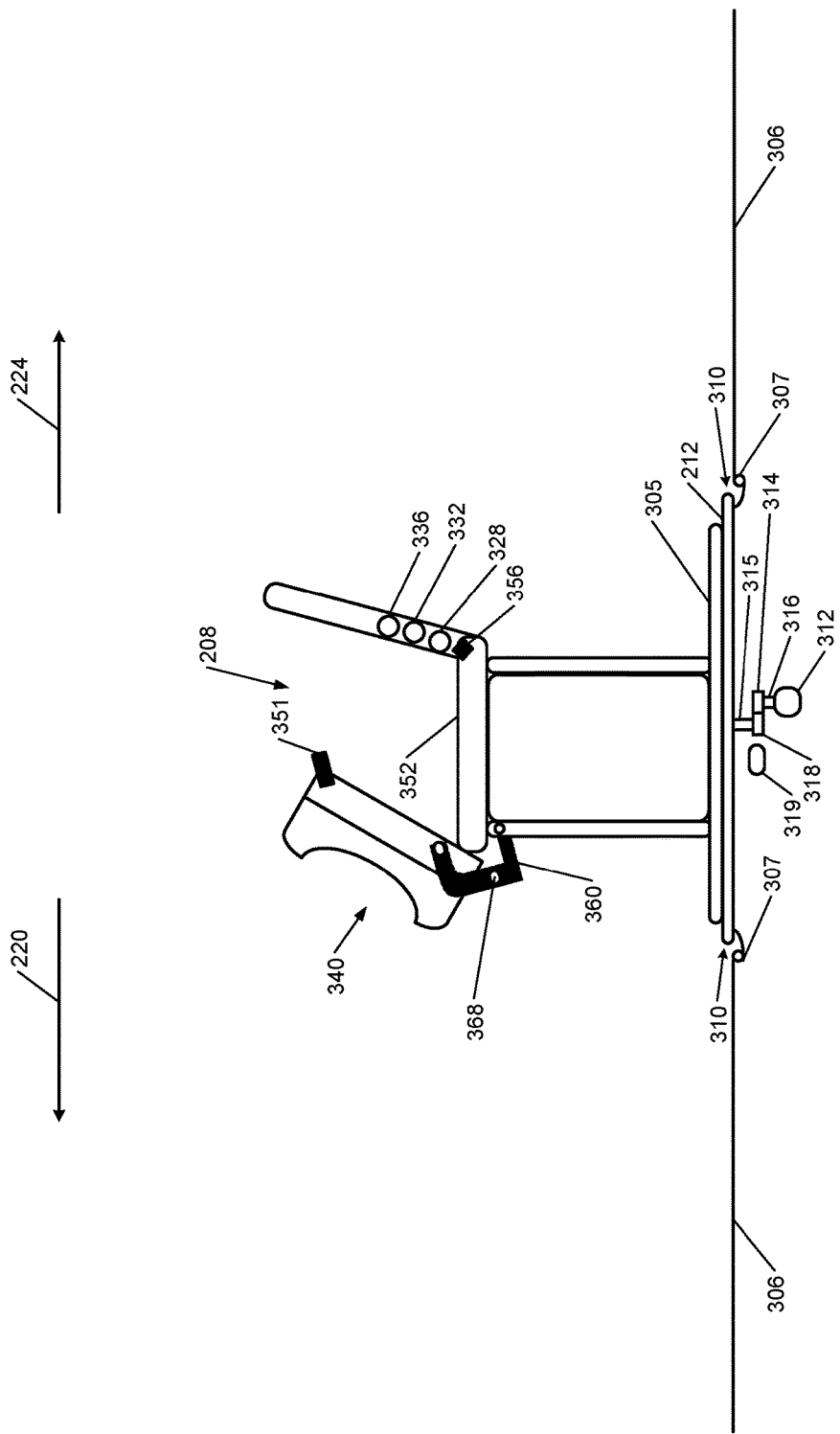
FIG. 11 includes a functional block diagram of a side view of a seat in between a second position and a third position.

The lower portion 340 is in a fourth position in FIG. 11. The fourth position is (in terms of rotation of the first output shaft 376) between the third position and the second position. When the lower portion 340 is at positions between the first position and the third position, the stops 368 and 369 prevent the lower portion 340 from pivoting about an axis between the second connection points 372 and 373. The second side 530 of the lower portion 340 contacts the cushion portion 352 of the seat 208 when the lower portion 340 is in the fourth position. Due to the contact between the second side 530 and the cushion portion 352, the lower portion 340 rotates about the an axis between the second connection points 372 and 373 such that the second side 530 of the lower portion 340 rests upon the cushion portion 352 of the seat 208 when the lower portion 340 reaches the second position. While the example of the lower portion 340 being actuated by the actuator 375 is provided, the lower portion 340 may instead be manually actuated between the first and second positions and the actuator 375 may be omitted.

Figure 12:
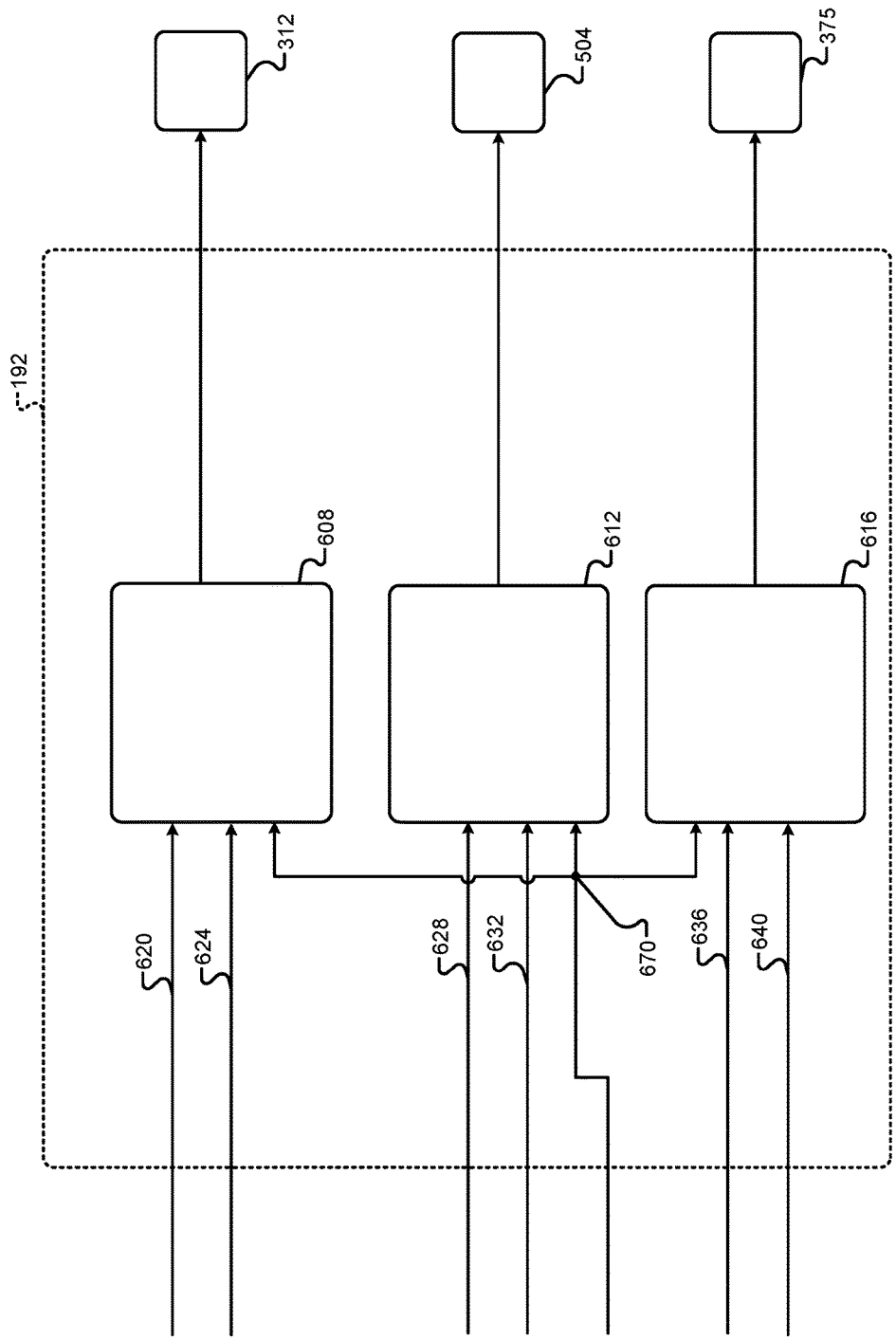
FIG. 12 includes a block diagram of an example seat control system.

With reference to FIG. 12, the seat control module 192 is shown. The seat control module 192 includes a rotational position module 608, a longitudinal position module 612, and a lower portion module 616.

The rotational position module 608 receives a current rotational position of the seat 208 from the rotational position signal 620. The rotational position module 608 sets a target rotational position of the seat 208 based on a first user input signal 624 from the first user input device 328 indicative of requests to adjust the rotational position of the seat 208. For example, the rotational position module 608 may increase the target rotational position (e.g., by a predetermined angle every predetermined period) in response to receipt of a first user input (e.g., actuation of the first user input device 328 in a first direction) indicative of a request to rotate the seat 208 in a first direction. The rotational position module 608 may decrease the target rotational position (e.g., by a predetermined angle every predetermined period) in response to receipt of a second user input (e.g., actuation of the first user input device 328 in a second direction) indicative of a request to rotate the seat 208 in a second direction. The rotational position module 608 rotates the rotational plate 212 and therefore the seat 208 to adjust the current rotational position to the target rotational position.

While the example of automatic control of the rotation of the seat 208 is provided, the seat 208 may be manually rotatable in various implementations. In the example of the seat 208 being manually rotatable, the rotational position module 608, the rotational position sensor 319, and the first electric motor 312 may be omitted. One or more other components may also be omitted.

The longitudinal position module 612 receives a current longitudinal position based on the longitudinal position signal 628. The longitudinal position module 612 sets a target longitudinal position of the seat 208 based on a second user input signal 632 from the second user input device 332 indicative of requests to adjust the longitudinal position of the seat 208. For example, the longitudinal position module 612 may increase the target longitudinal position (e.g., by a predetermined amount every predetermined period) in response to receipt of a second user input (e.g., actuation of the second user input device 332 in a first direction) indicative of a request to move the seat 208 in a first direction. The longitudinal position module 612 may decrease the target longitudinal position (e.g., by a predetermined amount every predetermined period) in response to receipt of a second user input (e.g., actuation of the second user input device 332 in a second direction) indicative of a request to move the seat 208 in a second direction. The longitudinal position module 612 moves the seat 208 along the rails 305 to adjust the current longitudinal position to the target longitudinal position.

While the example of automatic control of the movement of the seat 208 is provided, the seat 208 may be manually moveable along the rails 305 in various implementations. In the example of the seat 208 being manually rotatable, the longitudinal position sensor 508, the longitudinal position module 612, and the second electric motor 504 may be omitted. One or more other components may also be omitted.

The lower portion module 616 receives a current (e.g., angular) position of the lower portion 340 from the lower portion position signal 636. The lower portion module 616 sets a target position of the lower portion 340 based on a third user input signal 640 from the third user input device 336 indicative of requests to adjust the position of the lower portion 340 of the seat 208. The lower portion module 616 may set the target position to one of the first position, the second position, and the third position based on the third user input signal 640.

For example, when the target position is in the first position, the lower portion module 616 may transition the target position to the third position in response to a first user input (e.g., actuation of the third user input device 336 in a first direction). When the target position is in the third position, the lower portion module 616 may transition the target position to the first position in response to a second user input (e.g., actuation of the third user input device 336 in a second direction). When the target position is in the third position, the lower portion module 616 may transition the target position to the second position in response to the first user input (e.g., actuation of the third user input device 336 in the first direction). When the target position is in the second position, the lower portion module 616 may transition the target position to the third position in response to the second user input (e.g., actuation of the third user input device 336 in the second direction). The lower portion module 616 may leave the target position unchanged when the target position is in the first position and the second user input (e.g., actuation of the third user input device 336 in the second direction) is received. The lower portion module 616 may leave the target position unchanged when the target position is in the second position and the first user input (e.g., actuation of the third user input device 336 in the first direction) is received.

The lower portion module 616 may also actuate the latching mechanisms 351. For example, the lower portion module 616 may open/unlatch the latching mechanisms 351 when transitioning the target position from the second position to the third position or the first position. The lower portion module 616 may close/latch the latching mechanisms 351 when transitioning the target position to the second position.

Actuation of the seat 208 and the lower portion 340 may be controlled based on signals received from the first user input device 328, the second user input device 332, the third user input device 336, and/or the infotainment module 182. Actuation of the seat 208 and the lower portion 340 may also be controlled based on signals received from one or more remote devices, such as a mobile computing device (e.g., smartphone, tablet, computer, etc.). Signals may be received by the vehicle from remote devices, for example, in a shared vehicle setting. The vehicle receives signals from remote devices via one or more transceivers, such as the transceiver 242.

For example, the rotational position module 608, the longitudinal position module 612, and the lower portion module 616 may actuate the seat 208 in response to receipt of an infant signal 670 from a mobile device. The mobile device may transmit the infant signal 670, for example, in response to reservation of the vehicle and user input regarding use of an infant carrier by a user of the mobile device.

In response to the infant signal 670, the lower portion module 616 transitions the target position to the second position and accordingly actuates the lower portion 340 to the second position. Additionally, the longitudinal position module 612 and the rotational position module 608 may set the target longitudinal position and the target rotational position to a predetermined longitudinal position and a predetermined rotational position, respectively. The predetermined rotational position may be set such that the cushion portion 352 of the seat 208 is presented toward a door associated with the seat 208. The predetermined longitudinal position may be set such that the cushion portion 352 of the seat 208 is presented as close to the door associated with the seat 208 as possible. The lower portion 340 being in the second position and the seat 208 being in the predetermined longitudinal and rotational positions may ease latching of an infant car carrier to the infant car seat base 342 by a user.

Figure 13:
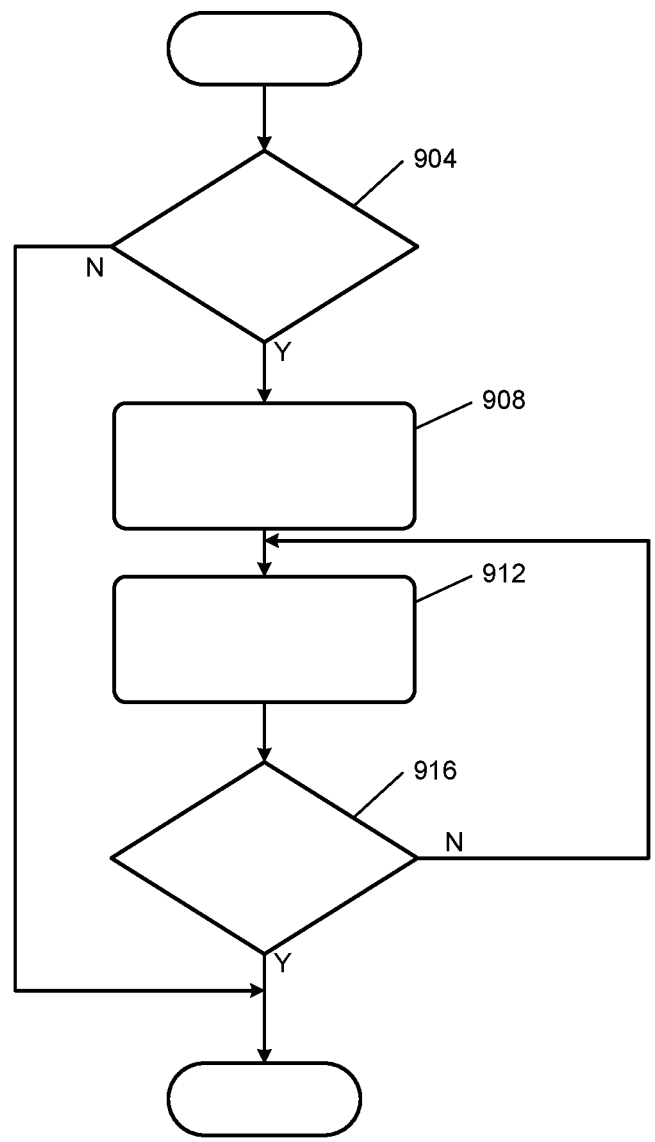
FIG. 13 includes a flowchart depicting an example method of actuating a lower portion to a first position.

FIG. 13 is a flowchart depicting an example method of actuating the lower portion 340 to the second position. Control may begin with 904 where the lower portion module 616 determines whether to actuate the lower portion 340 to the second position (e.g., as in FIG. 9). If 904 is true, control continues with 908. If 904 is false, control may end. The lower portion module 616 may determine to actuate the lower portion 340, for example, in response to user input from the third user input device 336 or in response to receipt of the infant signal 670.

At 908, the lower portion module 616 sets the target position of the lower portion 340 to the second position. At 912, the lower portion module 616 adjusts the lower portion 340 toward the target position. At 916, the lower portion module 616 determines whether the current position of the lower portion 340 is in the target position. If 916 is true, control may end. If 916 is false, control may return to 912. As discussed above, the rotational position module 608 and/or the longitudinal position module 612 may additionally (simultaneously or before or after actuation of the lower portion 340 to the second position) actuate the seat 208. While control is shown as ending, FIG. 13 is illustrative of one control loop and control may return to 904.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A seat system of a vehicle, comprising:
    a cushion portion configured to support an occupant sitting on the cushion portion;
    a back portion configured to support the back of the occupant sitting on the cushion portion;
    a lower portion including:
        a first side;
        a second side that is opposite the first side; and
        an infant car seat base located on the first side,
        wherein the infant car seat base includes a plurality of connection devices that are configured and arranged to connect to a plurality of different types of infant carriers;
    an actuator configured to selectively actuate the lower portion to:
        a first position where the infant car seat base is located entirely under the cushion portion; and
        a second position where at least a portion of the second side of the lower portion contacts the cushion portion and the infant car seat base is located entirely above the cushion portion.

2. The seat system of claim 1 wherein the actuator is further configured to an actuator configured to selectively actuate the lower portion to:
    a third position where the first side of the lower portion faces upward and the second side of the lower portion faces downward.

3. The seat system of claim 1 further comprising a plurality of anchors,
    wherein the lower portion further includes a plurality of latching mechanisms configured to latch to the plurality of anchors.

4. The seat system of claim 3 wherein the plurality of anchors are located between an end of the cushion portion and an end of the back portion.

5. The seat system of claim 1 wherein the actuator includes a plurality of C-shaped brackets that are fixed at first ends to a rotating shaft and are connected at second ends to the lower portion.

6. The seat system of claim 5 wherein the lower portion is configured to rotate about an axis between the second ends between:
when the second side of the lower portion begins to contact the cushion portion; and
when the lower portion reaches the second position.

7. The seat system of claim 6 wherein the actuator further comprises an electric motor that rotates the rotating shaft based on power applied to the electric motor.

8. The seat system of claim 7 further comprising a seat control module configured to selectively apply power to the electric motor based on signals from a user input device of the vehicle.

9. The seat system of claim 8 wherein the seat control module is further configured to selectively apply power to the electric motor based on signals from a mobile device that is separate from the vehicle.

10. The seat system of claim 1 further comprising:
a frame that supports the cushion portion and the back portion; and
a plurality of side members and a back member that, with the lower portion when the lower portion is in the first position, form an empty space under the cushion portion.

11. The seat system of claim 1 further comprising:
a rotatable plate; and
a frame that supports the cushion portion and the back portion and that is held to the rotatable plate.

12. The seat system of claim 11 further comprising a seat control module configured to selectively rotate the rotatable plate based on signals from a user input device of the vehicle.

13. The seat system of claim 12 wherein the seat control module is further configured to selectively rotate the rotatable plate based on signals from a mobile device that is separate from the vehicle.

14. The seat system of claim 11 further comprising:
a first rail that is fixed to the rotatable plate; and
a second rail that is mounted to the frame and that is configured to move along the first rail.

15. The seat system of claim 14 further comprising a seat control module configured to selectively move the second rail based on signals from a user input device of the vehicle.

16. The seat system of claim 15 wherein the seat control module is further configured to selectively move the second rail based on signals from a mobile device that is separate from the vehicle.

17. The seat system of claim 1 wherein the infant car seat base includes a plurality of connection devices that are configured and arranged to connect to a plurality of different types of infant carriers manufactured by different manufacturers.

18. A seat system of a vehicle, comprising:
a cushion portion configured to support an occupant sitting on the cushion portion;
a back portion configured to support the back of the occupant sitting on the cushion portion;
a lower portion including:
a first side;
a second side that is opposite the first side; and
an infant car seat base located on the first side includes a plurality of connection devices that are configured and arranged to connect to a plurality of different types of infant carriers manufactured by different manufacturers;
an actuator configured to selectively actuate the lower portion to:
a first position where the infant car seat base is located entirely under the cushion portion;
a second position where at least a portion of the second side of the lower portion contacts the cushion portion and the infant car seat base is located entirely above the cushion portion; and
a third position where the first side of the lower portion faces upward and the second side of the lower portion faces downward,
a plurality of anchors located between an end of the cushion portion and an end of the back portion,
wherein the lower portion further includes a plurality of latching mechanisms configured to latch to the plurality of anchors,
a rotatable plate;
a frame that supports the cushion portion and the back portion and that is held to the rotatable plate;
a plurality of side members and a back member that, with the lower portion when the lower portion is in the first position, form an empty space under the cushion portion;
a first track that is fixed to the rotatable plate; and
a second track that is mounted to the frame and that is configured to move along the first track.

19. The seat system of claim 18 further comprising a seat control module configured to:
selectively actuate the actuator based on signals from a first user input device of the vehicle and based on signals from a mobile device that is separate from the vehicle;
selectively rotate the rotatable plate based on signals from a second user input device of the vehicle and based on the signals from the mobile device that is separate from the vehicle; and
selectively move the second track based on signals from a third user input device of the vehicle and based on the signals from the mobile device that is separate from the vehicle.

20. A seat system of a vehicle, comprising:
a cushion portion configured to support an occupant sitting on the cushion portion;
a back portion configured to support the back of the occupant sitting on the cushion portion;
a plurality of anchors;
a lower portion including:
a first side;
a second side that is opposite the first side;
an infant car seat base located on the first side; and
a plurality of latching mechanisms configured to latch to the plurality of anchors;
an actuator configured to selectively actuate the lower portion to:
a first position where the infant car seat base is located entirely under the cushion portion; and a second position where at least a portion of the second side of the lower portion contacts the cushion portion and the infant car seat base is located entirely above the cushion portion.

21. A seat system of a vehicle, comprising:
a cushion portion configured to support an occupant sitting on the cushion portion;
a back portion configured to support the back of the occupant sitting on the cushion portion;
a lower portion including:
 a first side;
 a second side that is opposite the first side; and
 an infant car seat base located on the first side;
an actuator that includes a plurality of C-shaped brackets that are fixed at first ends to a rotating shaft and are connected at second ends to the lower portion and that is configured to selectively actuate the lower portion to:
 a first position where the infant car seat base is located entirely under the cushion portion; and
 a second position where at least a portion of the second side of the lower portion contacts the cushion portion and the infant car seat base is located entirely above the cushion portion.

22. A seat system of a vehicle, comprising:
a cushion portion configured to support an occupant sitting on the cushion portion;
a back portion configured to support the back of the occupant sitting on the cushion portion;
a lower portion including:
 a first side;
 a second side that is opposite the first side; and
 an infant car seat base that is located on the first side and that includes a plurality of connection devices that are configured and arranged to connect to a plurality of different types of infant carriers manufactured by different manufacturers;
an actuator configured to selectively actuate the lower portion to:
 a first position where the infant car seat base is located entirely under the cushion portion; and
 a second position where at least a portion of the second side of the lower portion contacts the cushion portion and the infant car seat base is located entirely above the cushion portion.

* * * * *